United States Patent
Elze et al.

(10) Patent No.: US 6,498,678 B2
(45) Date of Patent: Dec. 24, 2002

(54) OPTICAL FIBRE AMPLIFIER WITH UV LIGHT ABSORPTION

(75) Inventors: Gerhard Elze, Antony (FR); Pascal Baniel, Draveil (FR); Dominique Bayart, Clamart (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/742,112

(22) Filed: Dec. 22, 2000

(65) Prior Publication Data

US 2001/0021061 A1 Sep. 13, 2001

(30) Foreign Application Priority Data

Jan. 31, 2000 (EP) .......................... 00440026

(51) Int. Cl.⁷ .......................... H04B 10/12; G02B 6/36; G02B 6/00
(52) U.S. Cl. .................. 359/341.5; 359/341.1; 359/341.3; 385/90; 385/141
(58) Field of Search .......................... 359/333, 341.5, 359/337.3, 341.3; 372/40; 501/44

(56) References Cited

U.S. PATENT DOCUMENTS

| | | | |
|---|---|---|---|
| 4,784,458 A | * 11/1988 | Horowitz | 350/96.21 |
| 4,962,995 A | * 10/1990 | Andrews | 350/96.34 |
| 5,309,452 A | * 5/1994 | Ohishi | 372/6 |
| 5,313,547 A | * 5/1994 | Lambard | 385/142 |
| 5,473,713 A | * 12/1995 | Ronarc'H | 385/28 |
| 5,502,591 A | 3/1996 | Semenkoff et al. | 359/341 |
| 5,838,487 A | * 11/1998 | Nilsson | 359/341 |
| 5,867,515 A | * 2/1999 | Jordan | 372/40 |
| 5,936,762 A | * 8/1999 | Samson | 359/341 |
| 5,973,824 A | 10/1999 | Sanghera et al. | 359/341 |
| 6,272,277 B1 | * 8/2001 | Heo | 385/142 |
| 6,277,776 B1 | * 8/2001 | Clare | 501/44 |

FOREIGN PATENT DOCUMENTS

GB 2 243 942 A 11/1991

OTHER PUBLICATIONS

Roy, F. et al. "Novel pumping schemes for thulium doped fiber amplifier." OFCC, 2000. Mar. 2000. pp. 14–16.*
Bayart, D. "Broadband fiber amplifiers." OFC 1998. Technical Digest. pp. 100–101.*
Chbat, M. et al. "Systems Aspects of fluordide–based EDFAs." OFC 1997. OFC Technical Digest. pp. 83–84.*
Hewak, D.W. et al. "Quantum–Effciency o fpraseodymium Doped Ga:La:S Glass for 1.3 um Optical Fiber Amplifiers." IEEE Photonics Tech. Lett. vol. 6, No. 5, May 1994. pp. 609–612.*
Hewak, D.W. et al. "Low Phonon Energy Glasses for Efficient 1.3 um Optical Fibre Amplifiers." Elect. Lett. vol. 29, No. 2, Jan. 1993. pp. 237–239.*
Heo, J. et al. "Chalcohalide glasses doped with Dy3+ for fiber–optic amplifiers at 1.3 um wavelength." CLEO 1999. pp. 244 245.*

(List continued on next page.)

*Primary Examiner*—Thomas H. Tarcza
*Assistant Examiner*—Andrew R Sommer
(74) *Attorney, Agent, or Firm*—Sughrue Mion, PLLC

(57) ABSTRACT

An optical fiber amplifier is proposed comprising at least one pump light source (3), at least one amplifying fiber section (10), and at least one coupler (8) which establishes a connection between the input fiber (1) of the fiber type I, the pump light source (3), the amplifying fiber section (10), and the output fiber (12) of the fiber type I. The amplifying fiber section (10) consists of a fiber type II, and the the splices (2, 11) between the fiber type I and the fiber type II are arranged relative to the amplifying fiber section (10) such that light propagated in the direction opposite to the signal direction and light propagated in the signal direction passes through means absorbent of short wavelengths before it reaches the splices.

14 Claims, 2 Drawing Sheets

OTHER PUBLICATIONS

"coupler" The Photonics Distionary. www.photonics.com/dictionary/.*

"Lead–Induced Instability of ZBLAN–Flouride Glass", Aug. 12, 1999, retrieved from the internet http://www.nsls.bnl.gov/BeamRD/LiteBites/Citrin.2.htr.

"ZBLAN constinues to show promise", Aug. 12, 1999, retrieved from the internet http://www.science.nasa.gov/newhome/headlines/msad05feb98_1.htr.

* cited by examiner

OPTICAL FIBRE AMPLIFIER WITH UV LIGHT ABSORPTION

BACKGROUND OF THE INVENTION

Prior Art

The invention is based on an optical fibre amplifier comprising at least one pump light source (3), at least one amplifying fibre section (10), and at least one coupler (8) which establishes a connection between the input fibre (1) of the fibre type I, the pump light source (3), the amplifying fibre section (10) and the output fibre (12) of the fibre type I.

Different fibre amplifiers employing many different types of amplifying fibres are known from the prior art. For example, U.S. Pat. No. 5,973,824 is known, which describes the production and use of an amplifying fibre composed of a glass composition of germanium, arsenic, selenium and sulphur. It is also known to use other non-oxidic types of glass as material for amplifying fibres. In particular, the use of materials consisting of halides and sulphides doped with rare earths as amplifying fibres seems promising. Compared to silica glass, halide- and in particular fluoride glass has transparent properties which extend spectrally substantially further into the long-wave range. This is due to the spectral shift of the multi-phonon absorption edge as a result of the incorporation of substantially heavier ions. However, these types of glass present technological difficulties in respect of material production and fibre preparation. Their unfavourable mechanical properties and unfavourable behaviour in humid atmospheres have so far prevented their large-scale use. Recently it has been possible to produce fibre amplifiers operating with fibres composed of ZBLAN (Zr—Ba—La—AIL—Na) fluoride glass. Due to its relatively high refractive index and the flexibility of its composition, sulphide glass can be considered as a promising candidate for use as amplifying material. Therefore great efforts are being undertaken world-wide to produce many different types of halide glass with low phonon energies. As disclosed in U.S. Pat. No. 5,973,824, the special fibres, which in the following description will be referred to as "fibre type II", are glued-in by means of glue splices between the standard, silica-based glass fibres, referred to in the following as "fibre type I". Because of the different thermal coefficients of silica fibres (fibre type I) and halide fibres (fibre type II), the fused splices normally employed in telecommunications technology cannot be used. It is therefore only possible to use mechanical splices or glue splices. As mechanical splices have disadvantages in terms of the precision and permanence of their positioning, the fibres of fibre type I and fibre type II are joined using glue splices. The refractive index adaptation and mechanical stabilization of a glue splice are achieved by the use of a special glue. The behaviour of this index-adaptable special glue is critical with regard to aging and premature embrittlement due to loading with UV-light.

SUMMARY OF THE INVENTION

The optical fibre amplifier according to the invention comprising at least one pump light source 3, at least one amplifying fibre section 10, and at least one coupler 8 which establishes a connection between the input fibre of the fibre type I, the pump light source 3, the amplifying fibre section 10 and the output fibre 12 of the fibre type I, has the advantage that all the splice connections between the fibre type I and the fibre type II are located at a distance from the amplifying fibre section such that short wavelength light is already noticeably attenuated. The optical fibre amplifier is constructed such that the critical glue splices are exposed to a reduced proportion of UV light as the critical short-wave light of the blue- and UV-wavelength is attenuated by a suitable absorbent means.

Advantageous further developments and improvements of the optical fibre amplifier described in the main claim are possible as a result of the measures described in the subclaims.

BRIEF DESCRIPTION OF THE DRAWINGS

Exemplary embodiments are illustrated in the drawings and explained in detail in the following description. In the drawings.

DETAILED DESCRIPTION OF THE INVENTION

Figure 1:
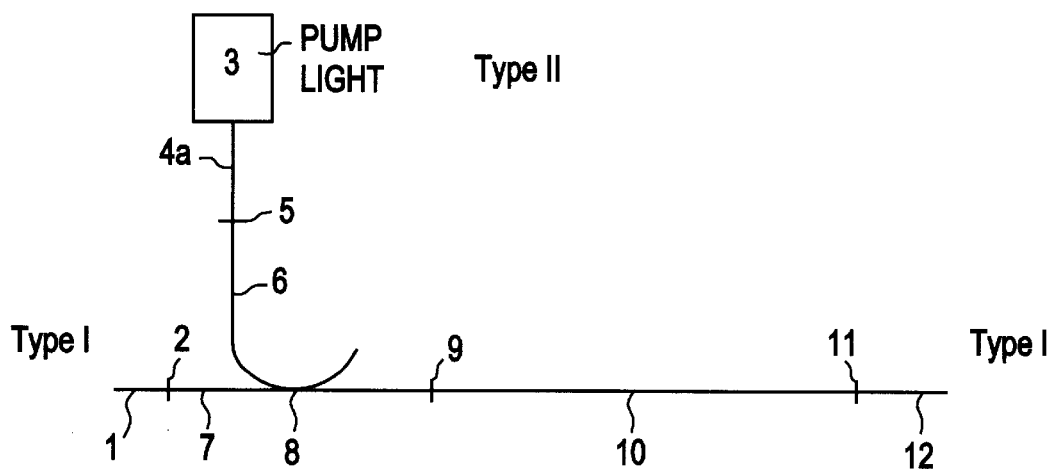
FIG. 1 illustrates an optical fibre amplifier in a first embodiment.

The construction of an optical fibre amplifier is shown schematically in FIG. 1. The input fibre 1 is connected to a first fibre section 7 of a coupler 8 by a glue splice (I-II) 2. A pump light source 3 is connected via a second fibre section 6 of the coupler 8. Here the pump light source 3 comprises a pigtail terminal 4*a* which is fused to the second fibre section 6 of the coupler by a fused splice 5. The output fibre of the coupler is fused to an amplifying fibre section 10 by a fused splice 9. The output of the amplifying fibre section is glued to an output fibre 12 by the glue splice (II-I) 11. In this exemplary embodiment only the input fibre 1 and the output fibre 12 are composed of fibres of the fibre type I, generally standard silica fibres. The optical signal to be amplified is supplied to the amplifier via the input fibre 1. Prior to the input-coupling of the pump light of the pump light source 3, the silica fibre is fused to the first fibre section 7 of the coupler 8. The entire coupler 8 here consists of material of the fibre type II. In this example the fibre connection to the pump light source 3 also consists of a pigtail terminal composed of the fibre type II and a fusion splice to the second fibre section of the coupler 8. As the coupler 8 itself consists of material of the fibre type II, its fibre terminal can be connected via a fused splice 9 to the doped, and thus amplifying, fibre section 10. The pump light, which for example consists of light with a wavelength of 980 nm, is for the greater part input-coupled in the forwards direction, thus in the direction of the fibre to be amplified. Certain components of the pump light which are propagated in the opposite direction to the signal direction are small and do not impose a further load on the glue splice 2. The pump light excites the doping ions in the amplifying fibre 10, whose inversion state is interrogated by the optical signal when it passes through the amplifying fibre section. The backwards scattered light components which thereby occur, and which have high-energy components in the UV- and blue wavelength range caused by Raman effects, pass through the entire fibre link between the fused splice 9, and the glue splice 2, whereby the UV-light is already partially absorbed in the fibre section of the fibre type II and can also only partially overcome couplers in the backwards direction. This gives rise to a reduction in the energy density as a result of short-wave light components at the glue splice 2. This has the result that the glue splice 2 is not heavily loaded, whereby aging processes are reduced. The second glue splice 11 at the output end of the fibre amplifier also is not heavily loaded by short-wave light components. On the one hand, the pump light components are reduced within the amplifying fibre section 10, and on the other hand the proportion of forwards scattered UV light is small and is absorbed by the amplifying fibre 10 itself.

In the example illustrated in FIG. 1, the optical fibre amplifier according to the invention is pumped in the propagation direction of the optical signal. In another embodiment, the optical fibre amplifier is pumped in the opposite direction to the propagation direction and the construction is mirror-inverted to that shown in FIG. 1.

Figure 2:
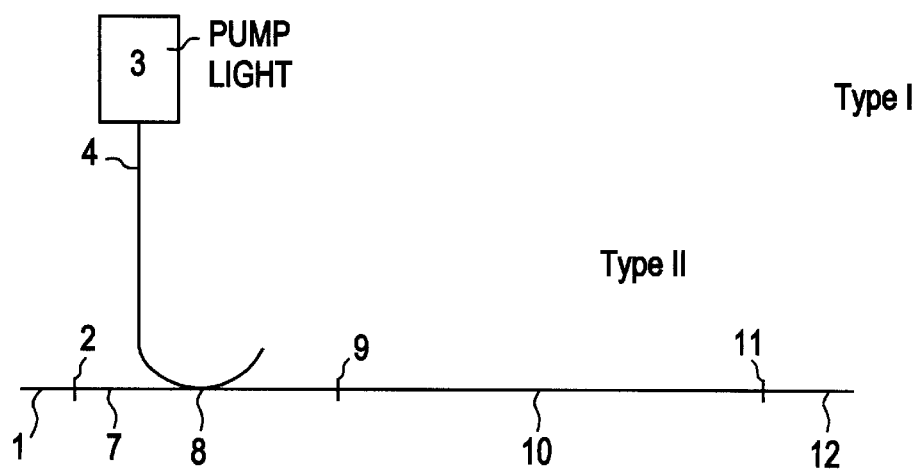
FIG. 2 illustrates an optical fibre amplifier in a second embodiment.

FIG. 2 illustrates a construction of a fibre amplifier very similar to that described in FIG. 1. Here however the pump light source 3 is directly connected to the coupler 8 by a fibre section 4.

Figure 3:
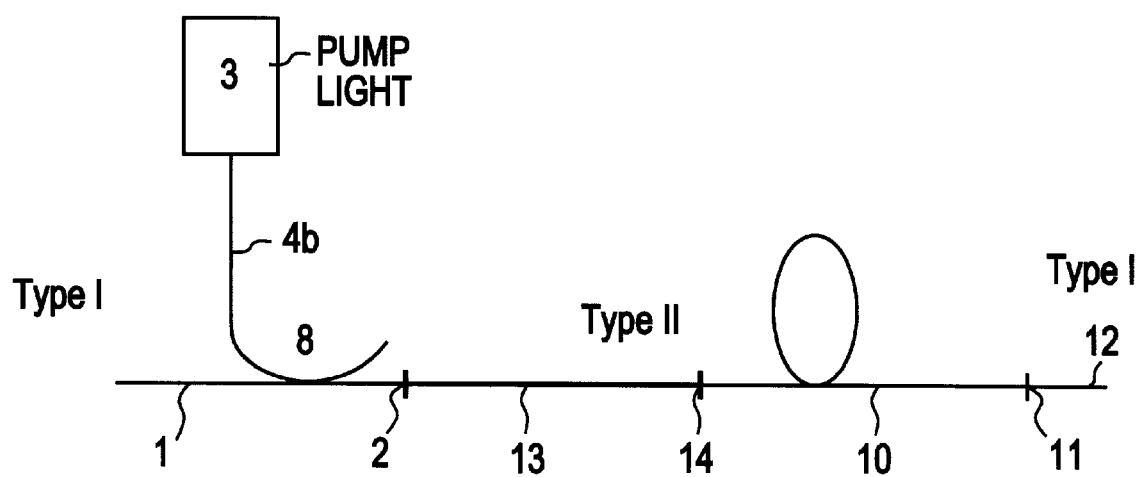
FIG. 3 illustrates an optical fibre amplifier in a third embodiment.

FIG. 3 illustrates another exemplary embodiment. Here again the input fibre 1 is connected to the coupler 8. The coupler 8 is connected to the pump light source 3 via a pigtail terminal 4b. The output of the coupler 8 is connected to the glue splice 2. An absorbent fibre 13 is glued to this glue splice. A splice 14 is a fused splice and connects the absorbent fibre 13 to the amplifying fibre section 10. At the output end the amplifying fibre 10 is connected to the output fibre. 12 via the glue splice 11.

In this embodiment the short-wave light components propagated by the amplifying fibre in the direction opposite to the signal direction are absorbed in a specially doped absorption fibre section 13. In this embodiment the coupler 8, with its fibre sections, is produced from fibres of the fibre type I. A glue splice junction is only required at or following the coupler. The absorbent fibre section is composed of the fibre type II and contains a doping which absorbs light of short wavelengths. For example, the UV-component of the backwards scattered light of a thulium-doped fluoride fibre can be distinctly reduced by chromium doping. In another embodiment the fused splice 2 is arranged directly in the coupler 8 or in a corresponding wavelength division multiplexer.

What is claimed is:

1. An optical fibre amplifier comprising:
   at least one pump light source,
   at least one amplifying fibre section connected to type I output fibre, said amplifying fibre section comprising a type II fibre,
   a coupler which establishes a connection between a type I input fibre, the pump light source, and the amplifying fibre section, wherein the coupler is connected to the type I input fibre via a first splice, the amplifying fibre section is connected to the type I output fibre via a second splice, the pump light source is connected to the coupler by a type II fibre section, and the first and second splices are arranged relative to the amplifying fibre section such that ultraviolet absorber of short wavelengths before reaching the first and second splices.

2. The optical fibre amplifier according to claim 1, wherein the first and second splices are glue splices.

3. The optical fibre amplifier according to claim 1, wherein the absorber is a type II fibre section.

4. The optical fibre amplifier according to claim 1, wherein the absorber is a doped type II fibre section.

5. The optical fibre amplifier according to claim 4, wherein the doped type II fibre section is doped with chromium.

6. The optical fibre amplifier according to claim 1, wherein the type II fibre section connecting the pump light source to the coupler comprises a pigtail type II fibre section of the pump light source.

7. The optical fibre amplifier according to claim 6, wherein the coupler comprises a type II fibre section connected to the pigtail type II fibre section of the pump light source via a fuse splice.

8. The optical fibre amplifier according to claim 1, wherein the coupler comprises a type II fibre material.

9. The optical fibre amplifier according to claim 1, wherein the coupler is connected to the amplifying fibre section via a fused splice.

10. The optical fibre amplifier according to claim 1, wherein the coupler comprises a type II input fibre section connected to the type I input fibre via a first splice and an type II output fibre section connected to the amplifying fibre section via a third splice.

11. An optical fibre amplifier comprising:
   a pump light source;
   an amplifying fibre section comprising a type II fibre;
   a coupler for connecting a type I input fibre, the pump light source, and the amplifying fibre section, wherein the coupler comprises an input type II fibre section and an output type II fibre section,
   wherein the input type II fibre section is connected to the type I input fibre via a first splice,
   wherein the amplifying fibre section is connected to the type I output fibre section via a second splice, and
   wherein the input type II fibre section and the output type II fibre section reduce ultraviolet light propagated by the amplifying fibre section in a direction opposite to a signal direction before reaching the first splice.

12. The optical fibre amplifier according to claim 11, wherein the first and second splices are glue splices.

13. The optical fibre amplifier according to claim 11, wherein the pump light source comprises a pigtail type I fibre section which connects the pump light source to the coupler.

14. The optical fibre amplifier according to claim 11, wherein the pump light source is connected to the coupler by a type II fibre section.

* * * * *